March 17, 1953 M. WALLACE 2,632,158
SYNCHROMETRIC MULTIPLEXING SYSTEM
Filed Sept. 23, 1947 7 Sheets-Sheet 2

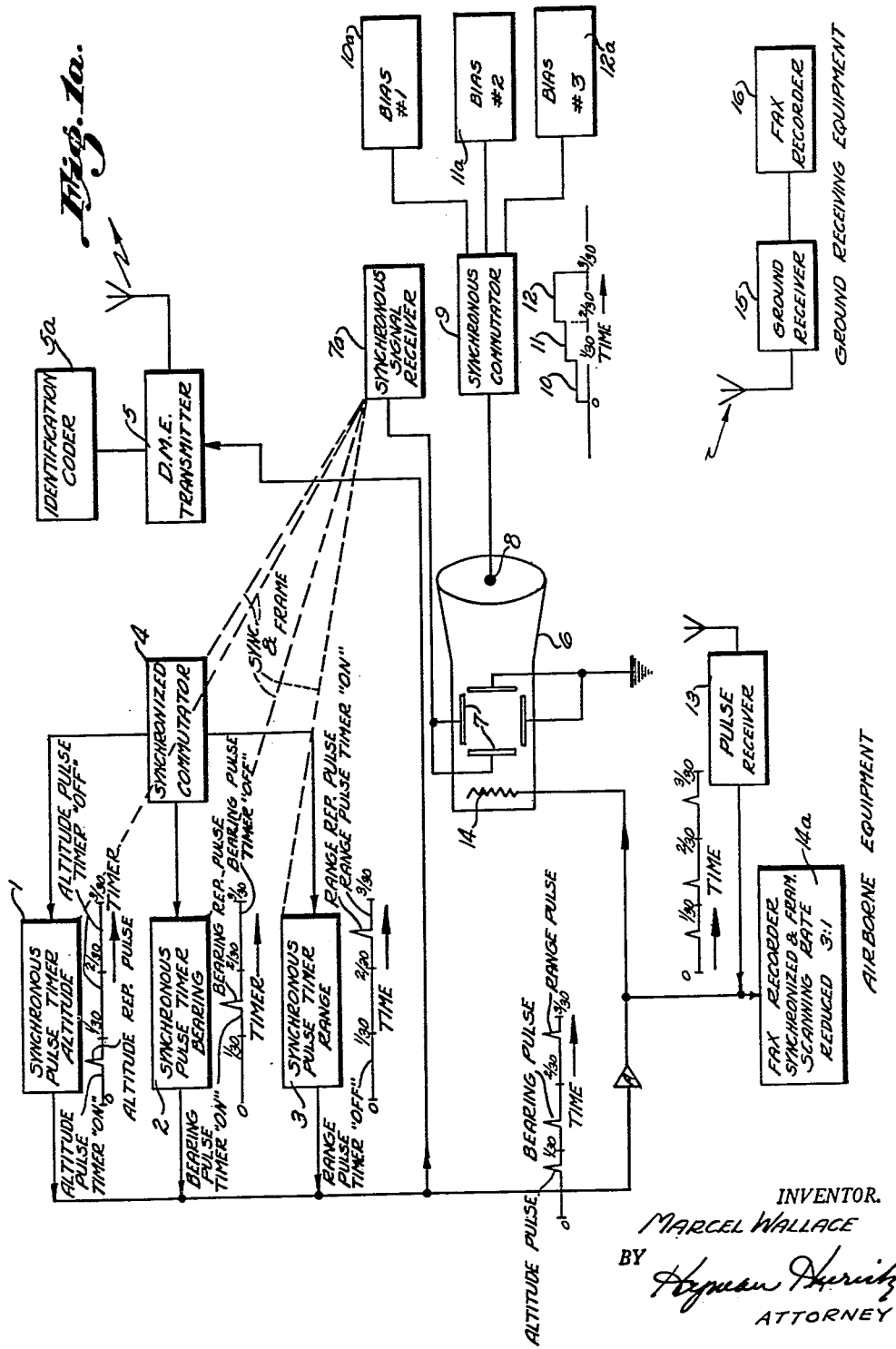

INVENTOR.
MARCEL WALLACE
BY Hyman Hurwitz
ATTORNEY

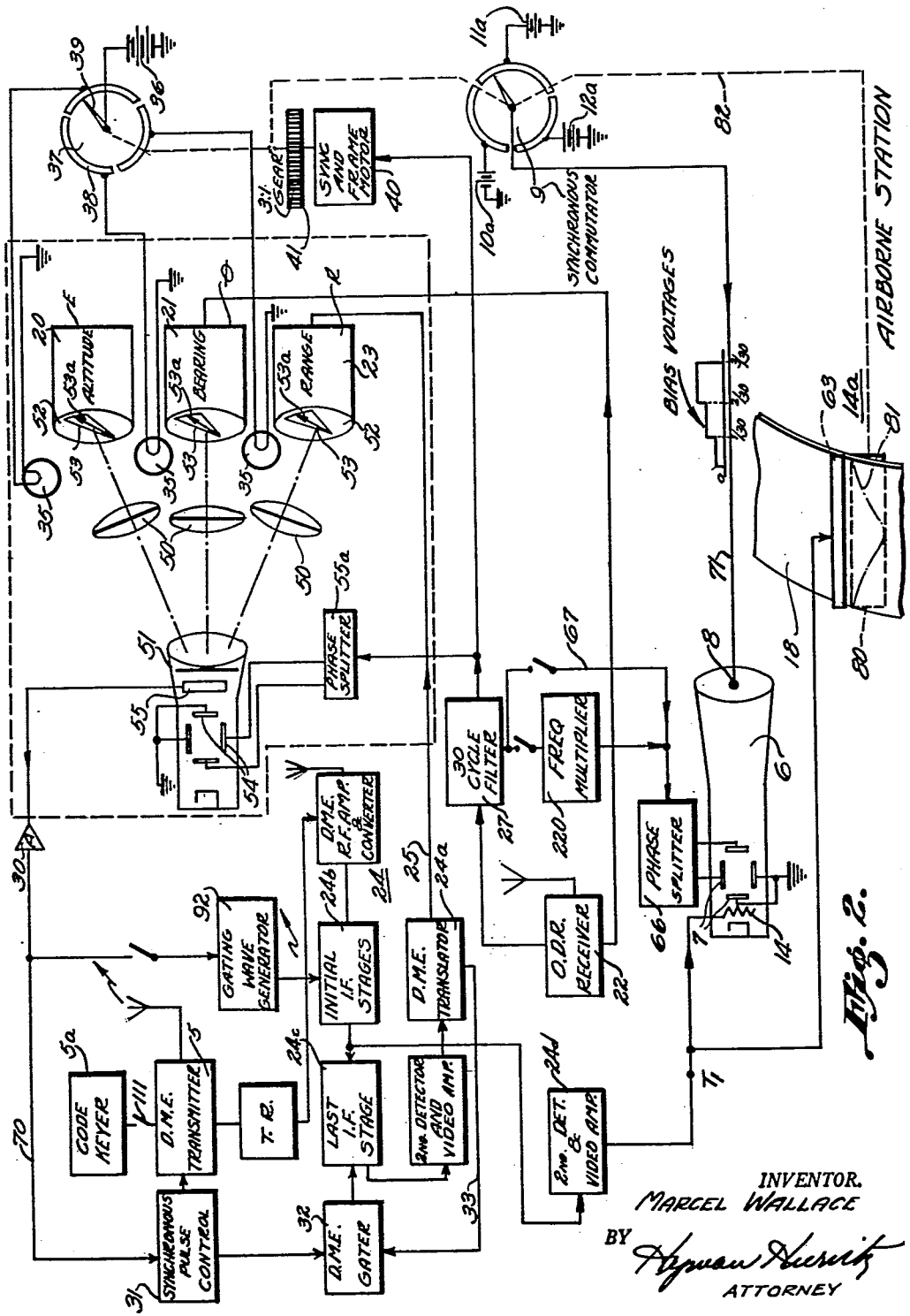

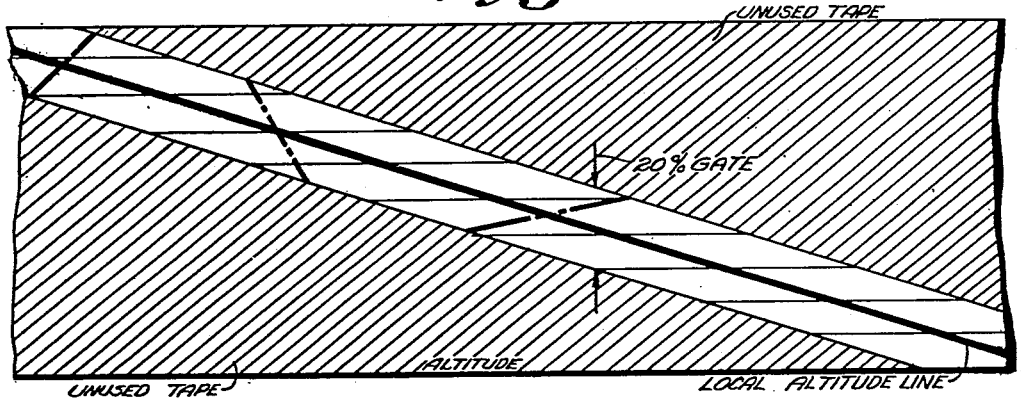
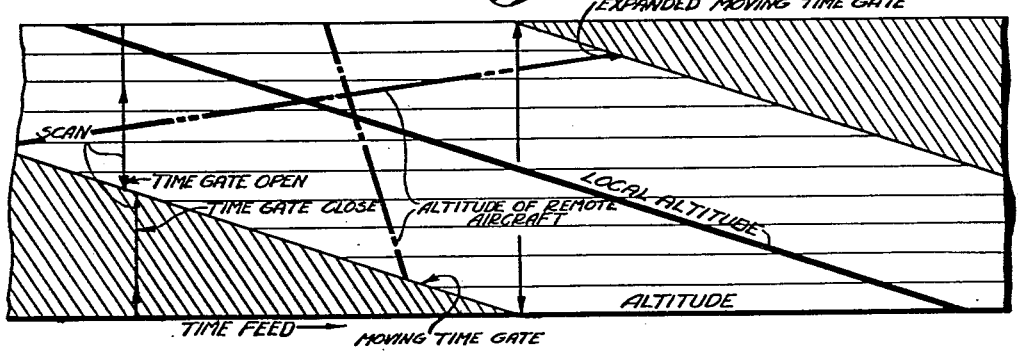
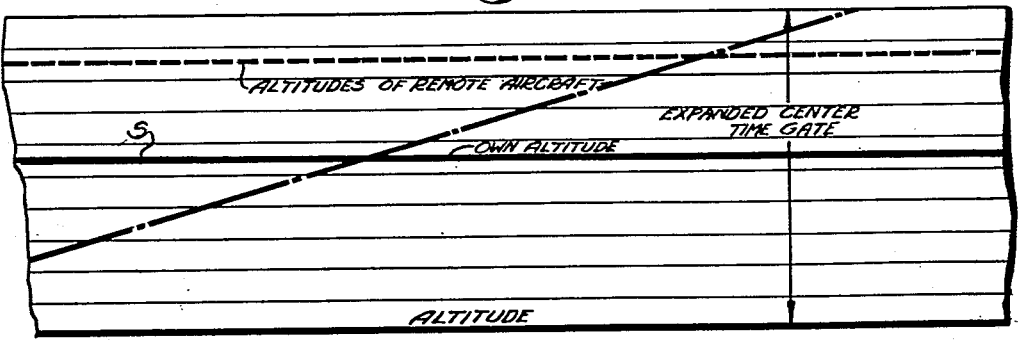
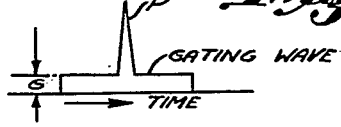

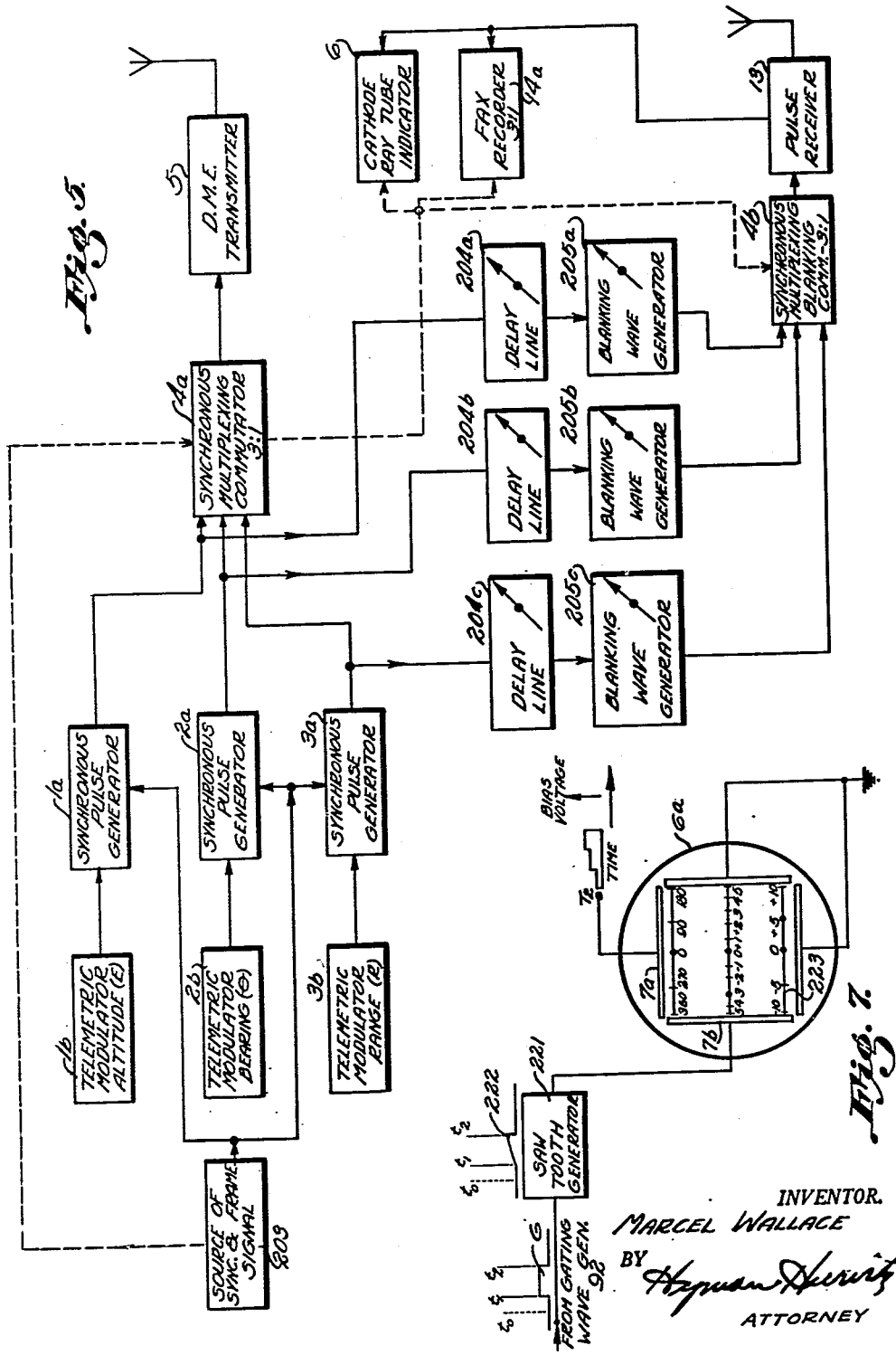

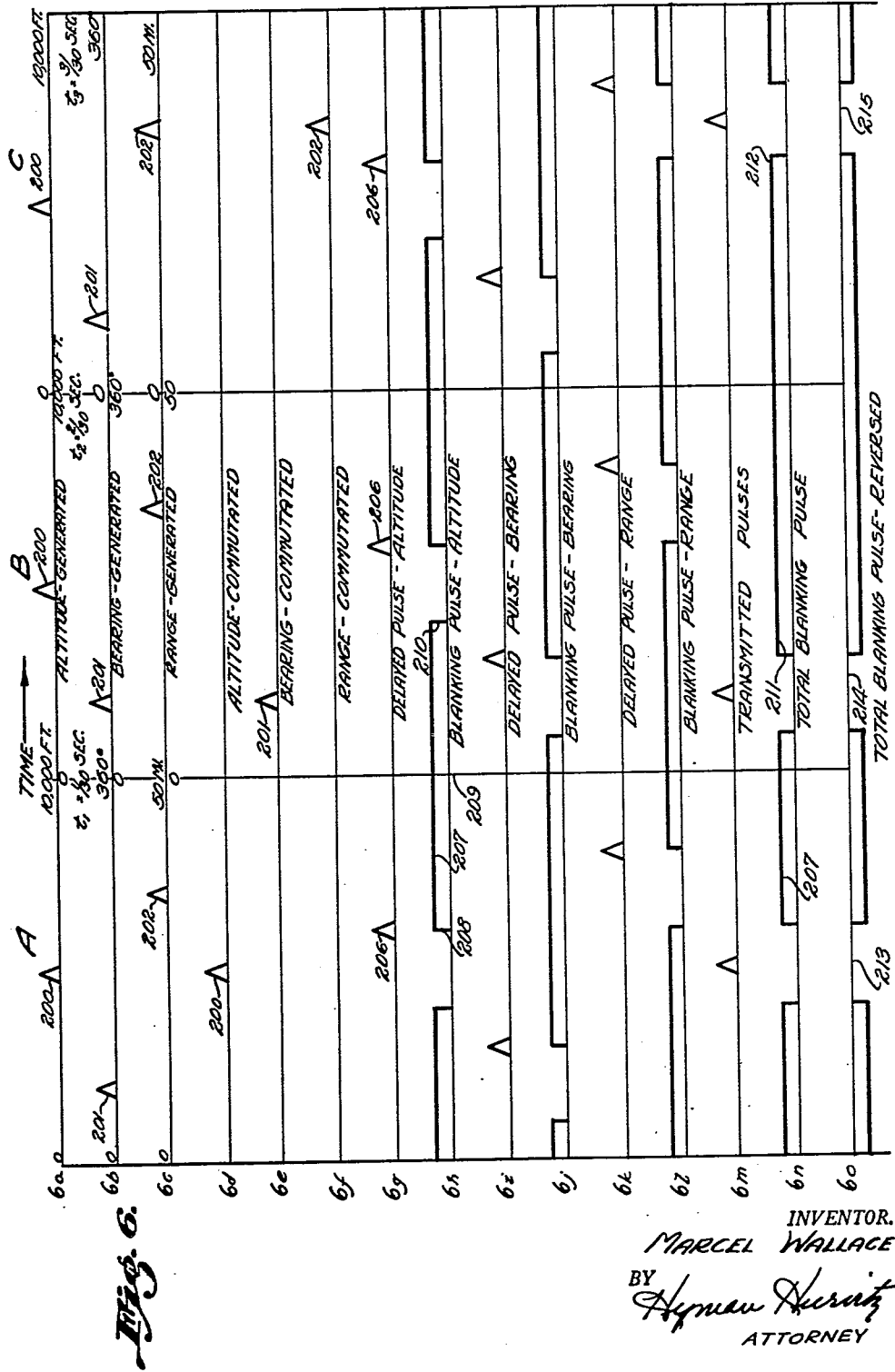

March 17, 1953   M. WALLACE   2,632,158
SYNCHROMETRIC MULTIPLEXING SYSTEM
Filed Sept. 23, 1947   7 Sheets—Sheet 7
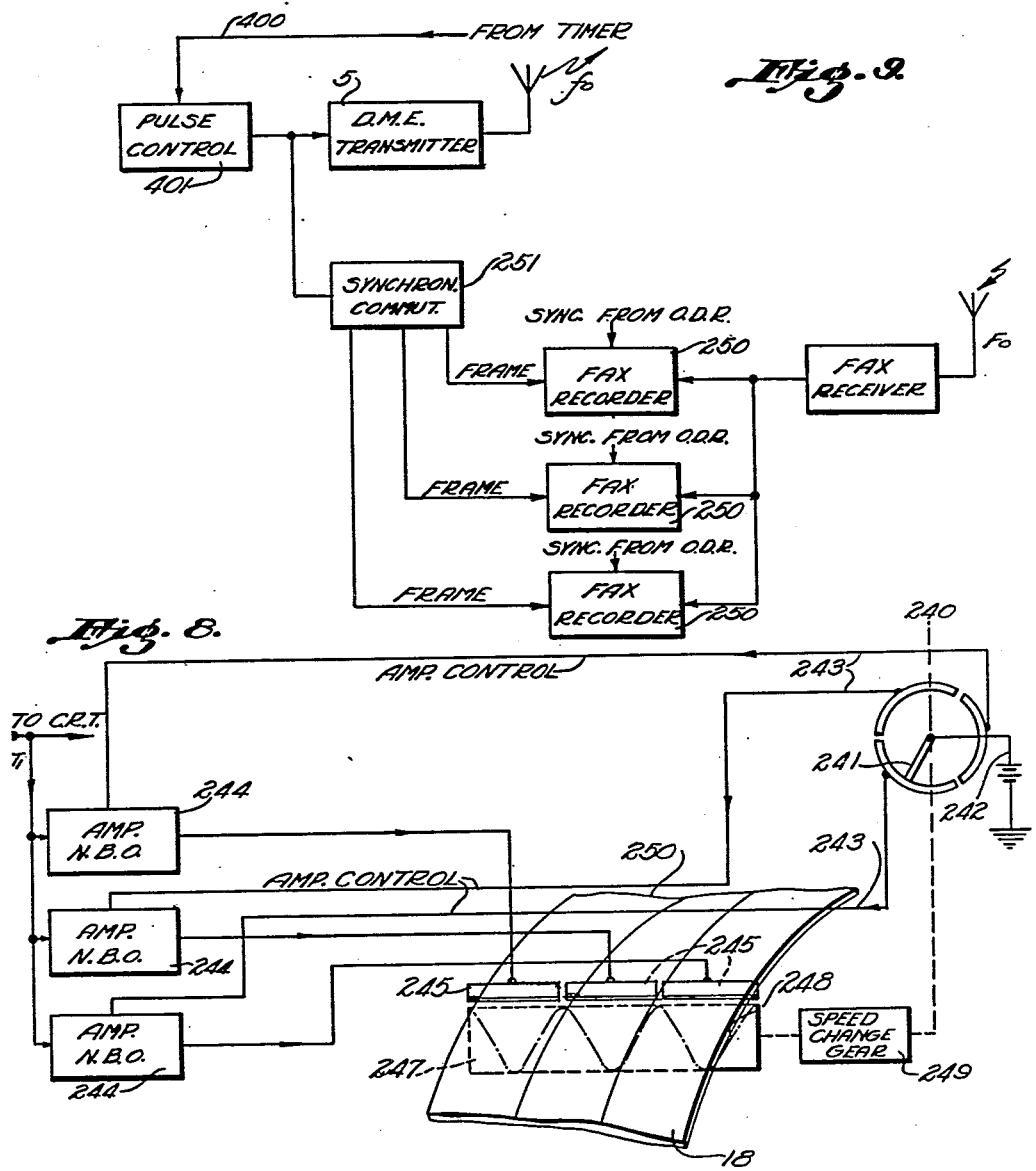
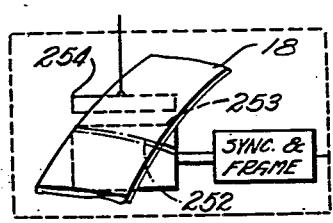
INVENTOR.
MARCEL WALLACE
BY
ATTORNEY Patented Mar. 17, 1953

2,632,158

UNITED STATES PATENT OFFICE 2,632,158

SYNCHROMETRIC MULTIPLEXING SYSTEM

Marcel Wallace, Port Chester, Conn., assignor, by mesne assignments, of one-half to said Wallace, doing business as Panoramic Laboratories, East Port Chester, Conn.

Application September 23, 1947, Serial No. 775,698

43 Claims. (Cl. 343—6)

This application is a continuation in part of application for U. S. Patent Serial No. 754,941, filed June 16, 1947, in the name of Marcel Wallace and entitled "Altitude and Distance Recorder," now U. S. Patent Number 2,609,532, as well as of Serial No. 770,686, filed August 26, 1947, in the name of Marcel Wallace and entitled "Synchronous Telemetric System," now U. S. Patent 2,538,065, and of further application Serial No. 633,138, filed December 6, 1945, in the name of Marcel Wallace and William Wu and entitled "Panoramic Position Indicators," now U. S. Patent 2,505,314.

The present application relates broadly to systems of aircraft traffic control and more particularly to air traffic control systems wherein the position of each of a number of aircraft may be continually and automatically reported by radio to a remote central location, as well as from each aircraft to every other aircraft in its vicinity.

It is a primary purpose of the present invention to provide a novel radio aid to air navigation and air traffic control.

It is a further purpose of the invention to provide a system of air navigation and traffic control wherein is recorded at a ground station continuously the important navigational parameters of all aircraft flying in the vicinity.

It is still a further object of the invention to provide a system of air navigation and traffic control wherein each aircraft adjacent to the traffic control center transmits continually by radio its altitude, range and bearing for reception and translation abroad all other craft in the vicinity, as well as at the control center.

A further object of the invention resides in the provision of means for utilizing the pulse transmitter of a distance measuring or radar equipment abroad each aircraft as a primary information transmitting device, determining the times of transmissions of distance measuring pulses according to the values of navigational parameters.

It is another object of the invention to transmit navigational information automatically by translating the readings of meters abroad various aircraft into time positions of pulses transmitted by transmitters comprised in pulse type distance measuring equipments.

Another object of the invention resides in the provision of novel indicating and recording equipment abroad the various aircraft utilizing the present system for providing a continuous time indication and/or record of the values of the navigational parameters associated with the various aircraft of the system.

It is still a further object to provide a system of telemetric transmission and reception utilizing pulse time position modulation wherein the receiver is gated to enable reception abroad any aircraft of selected navigational information deriving from other aircraft.

It is a further object of the invention to provide a system of air traffic control which is telemetric in nature and which is adapted to provide abroad each of a plurality of craft indications and/or records of the altitude and/or bearing and/or range of all aircraft having values of these parameters bearing predetermined relations to the values of the corresponding values abroad the given aircraft.

It is another object of the invention to provide a system of telemetric air traffic control of synchronized character, all information being transmitted in terms of time positions of signals in respect to a periodically repetitive time base which is common to the entire system.

It is another object of the invention to provide a system for transmitting telemetric information on a time-sharing basis from any desired number of measuring equipments and for indicating and/or recording the measurements in distinctive fashion on a common indicating and/or recording device.

It is still another object of the invention to provide various expedients for expanding the scale of indication and for selecting desired ranges of measurement in telemetric systems operating by pulse time position modulation.

The above and still further objects, advantages and features, of the present invention will become apparent upon consideration of the following detailed description cf one preferred specific embodiment thereof, especially when taken in conjunction with the accompanying drawings wherein:

Figure 1a represents in functional block diagram certain fundamental features of the present invention;

Figure 1b is a view of the face of an indicating cathode ray tube indicator, providing positional indications in accordance with the system of Figure 1a;

Figure 1c is a view of a portion of a record-receiving surface having recordings provided by a facsimile receiver, included in the system of Figure 1a;

Figure 2 is a circuit diagram of an airborne telemetric station in accordance with the invention, presenting an expansion of the disclosure of Figure 1a;

Figure 4 is a timing diagram illustrating the generation of time gating waves, and of pulsing signals;

Figure 5 is a functional block diagram of a further embodiment of an airborne station in accordance with the invention, and employing a novel time gating system;

Figure 6 is a timing diagram, useful in explaining the operation of the system of Figure 5;

Figure 7 is a functional block diagram of a modified indicating system, utilizable in the various embodiments of the invention, and providing for center gating of indications.

Figure 8 is a conventionalized representation of a facsimile recorder, with control circuits therefor illustrated in functional block diagram;

Figure 9 is a recording system, for use in the system of the invention, represented in functional block diagram, and providing for center gating of recorded indications;

Figure 10 represents the arrangement of a single facsimile type recorder which may be utilized in the system of Figure 9; and Figures 11 to 13, inclusive, represent records as produced by the various recording techniques of the invention.

Figure 1B:
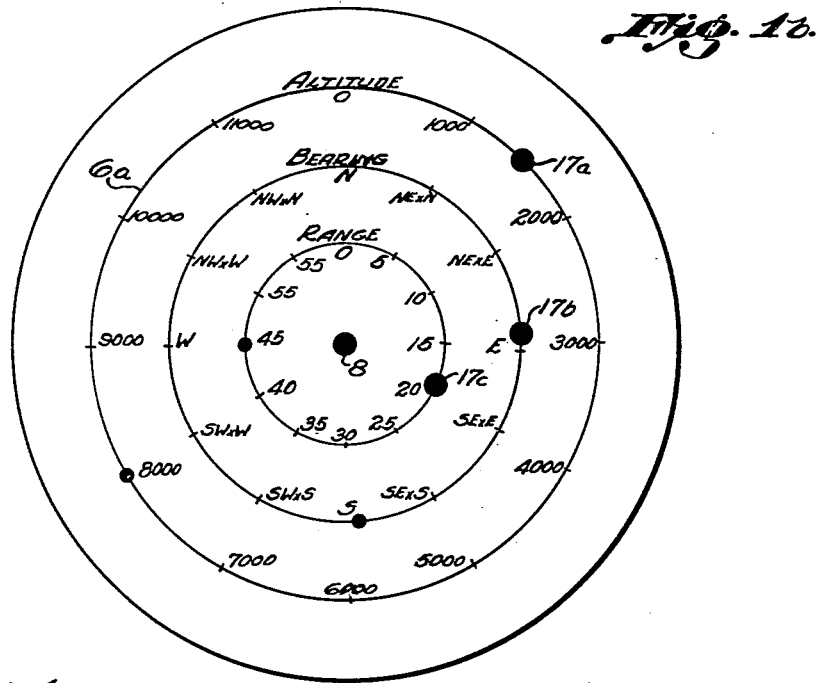

Proceeding first with a brief description of the basic invention, the system relies upon the provision of a common repetitive time base for all stations of the system to enable interpretation of the times of occurrence of signals of telemetric significance. Such signals may be provided in any one of a number of ways, such as by use of timing pulses derived from ground radar stations, or from range stations. Since as of present date the Civil Aeronautics Authority has standardized for use at all airports and traffic control centers an omnidirectional beacon system which provides 30-cycle modulation of equal phase omnidirectionally, and since all aircraft are expected to be equipped with receivers adequate for receiving and analyzing transmissions from the omnidirectional beacons, I may abstract from the said receivers the 30-cycle signal referred to, aboard each aircraft, and utilize this signal to provide synchronization of the various stations and a common time scale for the various stations. The 30-cycle synchronization voltage is utilized to control a scanning device, preferably electronic in nature, which scans continuously the ranges of possible positions of each of a plurality of meters, producing a control pulse in response to coincidence of the scanning medium with the position of a meter pointer. In order to avoid confusion between the readings of meters of different character, the meters are read on a time-sharing basis or successively.

The Civil Aeronautics Authority has standardized for use aboard aircraft a distance measuring system comprising fundamentally a pulse transmitter and a pulse receiver aboard each aircraft utilizing the system and a transponder at each airport or traffic control center which transponds pulses provided by the pulse transmitter back to the pulse receiver aboard each aircraft, the time of transmission providing a measure of range in a well known manner. The distance measuring transmitters and receivers aboard the aircraft will hereinafter be designated DME, an abbreviation of "distance measuring equipment" which has become conventional in the art. The present standardized DME transmits pulses at random and the DME receivers are gated in response to transmitted pulses to receive transponded pulses only at times corresponding with the ranges of the DME's. The purpose of this expedient is to prevent reception of transponded pulses or of directly transmitted pulses which are foreign to the given DME and which, therefore, would tend to cause erroneous distance measurement. The use of alternative types of pulsing radars or DME's is not, however, precluded but is equally applicable to utilization in the system.

In the system of the present invention the telemetrically controlled synchronous pulses referred to hereinabove are used to control the times of transmission of the DME transmitter aboard each aircraft so that transmissions are no longer random but occur at times having telemetric significance. Nevertheless, with respect to different aircraft flying in a given area, DME transmissions are random since the aircraft do not have identical positions and therefore transmit pulses at different times. In this manner the DME transmitter performs two functions, (1) its normal function of transmitting pulses for distance measuring purposes and (2) the function of transmitting pulses which are timed in such a manner as to enable translation of the pulse time positions into the remote indications of the values of telemetric quantities or navigational parameters. Since the DME receivers are gated to receive only during extremely short intervals corresponding with times of expected pulse receptions in a distance measuring operation, whereas the pulses transmitted from remote aircraft in the present invention may occur at any time depending upon the values of navigational parameters, an auxiliary signal translating device is provided for translating, in conjunction with the DME receiver, telemetric pulses transmitted by the various aircraft flying in an area. The latter device may be ungated, if desired, or, if gated, the gate may correspond with a given proportion of the total time consumed by one cycle of the system. The output of the telemetric signal translating device may be applied to a cathode ray tube type of indicating device and/or to a facsimile type recorder, these being arranged to provide continuous indications of the time positions of all received pulses and consequently of the telemetric significance of all received signals. The cathode ray tube indicator may be gated to indicate only signals having time positions adjacent to the time positions of transmitted pulses so that measured values which are of no interest aboard a given aircraft are automatically rejected. The facsimile type recorder, likewise, may be of such character as to enable gating and the consequent rejection of undesired information on the record-receiving surface of the recorder. As a further expedient, the scales of measurement on the cathode ray tube indicator, as well as on the recorder, may be expanded to any desired degree to take advantage to the maximum of the indicating or recording space available.

The ground or traffic control station of the system may be provided with a plurality of facsimile recording machines on each of which may be recorded values of one navigational parameter or one telemetric quantity from all aircraft in its vicinity, each of the recordings being in the form of a continuous line and each being identifiable in terms of its originating craft by virtue of the characters associated thereiwth and which, as has been explained hereinbefore, are transmitted from the various craft. Various facsimle receivers on the ground may all be synchonized from an omni-directional range receiver, sometimes referred to at ODR receiver, and may be supplied with telemetric information on a time-sharing basis by means of a commutator synchronized with the time-dividing commutator on the various aircraft. Alternatively, a single facsimile recorder may be provided at the ground station for recording values of all transmitted navigational parameters from the various aircraft, on a time-sharing basis as between parameters of different character.

Reference is made to two distinct types of gating which may be employed in the practice of the invention at the indicating and recording mechanisms. These distinct types of gating provide distinctive types of indications or recordings which will be referred to hereinafter as "moving gate" and "fixed gate," or "center gate," indications and recordings, respectively. Fundamentally, the two types of indications and/or records arise by reason of a difference in methods of framing. So, if framing of the indicators and/or recorders of the system is accomplished directly from the signals which provide a common time base for all the elements of the system, signals from a transmitting craft will be indicated and/or recorded aboard that craft as laterally moving points, assuming instantaneous positions determined by the navigational positions of the transmitting craft. This type of indication is denominated "moving gate." Should framing of indicators and/or recorders aboard a transmitting craft take place in response to transmissions from that craft, on the other hand, changes in the navigational parameters of that craft will have no effect on the indications and/or recordings corresponding with these parameters, and such indications and/or recording will remain stationary. Transmissions from other craft will be indicated and/or recorded at positions corresponding with the relative values of parameters associated with those craft, as compared with the values of parameters originating with the reference craft. Such indications are denominated "fixed gate" or "center gate."

Reference is now made to Figure 1a of the accompanying drawings wherein is illustrated in simple block diagram the fundamental elements of a simplified form of the present invention.

Fundamentally, the present system as exemplified in Figure 1a utilizes a plurality of "synchronous pulse timers" aboard each of a plurality of aircraft, which generate pulses having time positions within a predetermined cycle which are determined by the reading of a meter or by the value of a measurable quantity. Any number of such synchronous pulse timers may be provided and may be caused to transmit on a time-sharing basis by means of a suitable commutator or switching arrangement. All the synchronous pulse timers aboard all the aircraft of the system operate to provide pulses having time positions defined with respect to a common time base, which may itself be provided in any suitable manner. Pulses from the various aircraft are received aboard each of the aircraft and their time positions are indicated by means of a cathode ray tube oscilloscope having a sweep synchronized with the time base common to the system and/or by means of a facsimile recorder similarly synchronized. A central ground station may be provided for receiving pulse transmissions from the various aircraft and for indicating the time positions of the pulses on a facsimile recorder which is suitably synchronized and framed. In this manner may be provided indications aboard all aircraft flying in a given vicinity, as well as at a ground station in this same vicinity, of there pertinent navigational parameters which define the space positions of the aircraft at all times, and a time record of the values of these parameters is likewise provided which enables ready inspection of rates of parametric variation and of past history of the values of the parameters.

In Figure 1a, synchronous pulse times 1, 2 and 3 transmit pulses timed respectively in accordance with the altitude, bearing and range of a single aircraft, the timers 1, 2 and 3 being mutually synchronized and commutated by means of a synchronized commutator 4 to enforce transmission on a time-sharing basis. If we assume a fundamental time period of one-thirtieth of a second, the altitude timer 1 is turned on by the commutator 4 for one-thirtieth of a second and then turned off. The bearing timer 2 is then turned on for a succeeding thirtieth of a second and then turned off, and the range timer 3 is thereafter turned on for a further succeeding thirtieth second and then turned off, the cycle then repeating itself. The beginning times of the various thirtieth second periods is made common to all the aircraft of the system, and the pulse transmissions within each thirtieth second period occurs at times determined by the reading of the meters or by the value of the measurable quantity in a manner which is not indicated in Figure 1 but which will be clarified as the description of the invention proceeds.

The output pulses from the synchronous pulse timers 1, 2 and 3 are applied to a pulse transmitter, which may be a radar or a distance measuring transmitter, hereinafter referred to as a DME transmitter, and which is identifiable by the reference number 5. As of the present date, the Civil Aeronautics Authority has determined that all aircraft which are subject to traffic control shall carry DME transmitters to provide the aircraft with range information. It is for this reason that I propose to utilize the DME transmitter as pulse transmitting medium of the present system. It should be realized, however, that this is not essential to the system since an independent pulse transmitter may be provided. Utilization of the DME transmitter for transmitting telemetric information, however, results in simplification of the system, minimizing the total weight and volume of equipment which must be carried by each aircraft and consequently represents an important and particular advantage of the system.

Aboard each of the aircraft is provided a cathode ray tube oscilloscope 6 which comprises conventional deflecting electrodes 7, the latter being supplied with sweep signal to provide a suitable trace on the face of the oscilloscope, which is synchronized with the fundamental time period of the system. For the sake of example, I show the necessary connections to produce a circular trace, one complete circle being traced each thirtieth second. A deflecting anode 8 is further provided which is controlled from a synchronized commutator 9 which supplies to the cathode ray tube 6 bias voltages 10, 11 and 12 in succession from a series of bias sources of different magnitudes identified by the reference numerals 10a, 11a, and 12a, respectively. Synchronized commutator 9 may be identical with and may be synchronized with the commutator 4, and the internal connection may be such that bias source 10a may be applied to the anode 8 while pulse timer 1 is on, bias source 11a while pulse timer 2 is on, and bias source 12a while pulse timer 3 is on. In this manner concentric circles of different radius are traced out (see Figure 1b) one radius being allocated to each transmitted quantity. A pulse receiver 13 is provided for receiving pulses from similarly equipped aircraft transmitting their own positions over DME transmitters aboard the various aircraft, or from ground relay stations; for example, ground located DME transponders, the pulse receiver 13 comprising portions of the DME receiver, if desired (see Figure 2) or being entirely independent thereof, if desired. The output of pulse receiver 13 is applied to an intensifying electrode 14 of the oscilloscope 6, the grid 14 being normally biased to prevent formation of a trace on the face of the oscilloscope 6 and the output pulses from the pulse receiver 13 being of the proper magnitude and polarity to cause intensification in response to the receipt of each pulse. Since the circular sweep of the cathode ray beam of the tube 6 is synchronized with the fundamental time base common to the entire system of the invention, intensification of the beam occurs at points about the circular trace which correspond with pulse times of transmitted signals from the various aircraft and consequently with values of navigational parameters aboard these aircraft.

Figure 1C:
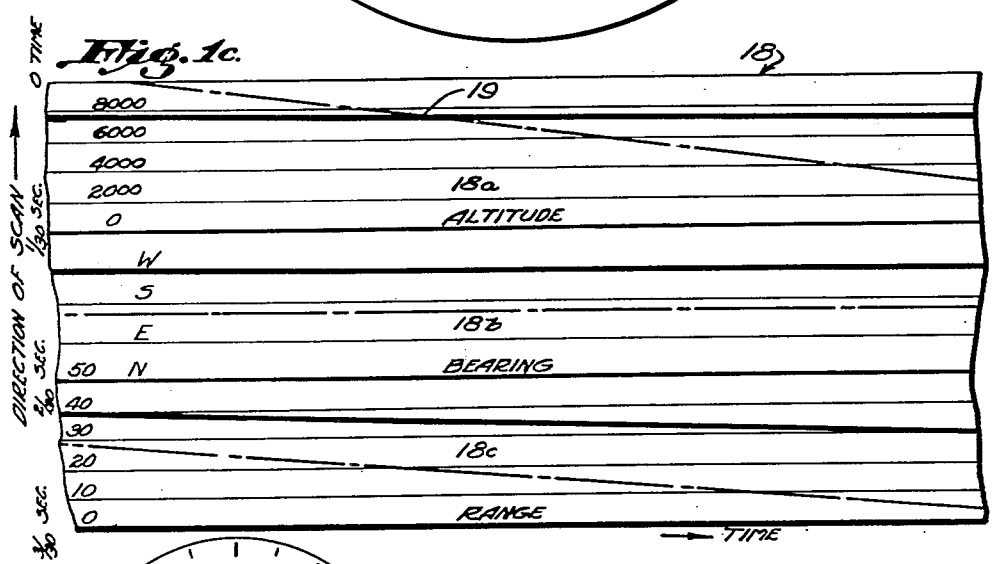

The output of the pulse receiver 13 is likewise applied to a facsimile recorder 14a of conventional design, generally, but which is caused to have a scanning rate of one-tenth of a second so that one complete scanning cycle of the facsimile recorder 14 enables recording of the pulse time positions of pulses from the pulse timers 1, 2 and 3 on adjacent portions of the record-receiving surface of the recorder (see Figure 1c). It will be realized that use of both the oscilloscope 6 and the recorder 14 is not essential to the operation of the system and that either one or the other may be utilized if desired.

At the ground station may be provided a receiver 15 for receiving pulses transmitted by the various DME transmitters 5 of the system and to the output of the receiver 15 may be coupled a facsimile recorder 16 which may be in all respects identical with facsimile recorder 14a aboard the aircraft, providing the ground station with a continuous time record of the navigational parameters of each aircraft flying in its vicinity. The ground transponder or relay station is not shown, it being understood that receiver 13 may be tuned to either the frequency of the DME transmitters on board aircraft, or to the frequency of a ground transponder or relay station, if one is used, since for the purposes of the present system the time lapse between transmission of a pulse and reception of that pulse after a transponding operation is negligible in comparison with the basic time period of the present system.

Mention has not been made heretofore of any source of synchronizing signals for the system. In this connection it will be realized that any suitable source of synchronizing signals may be provided from the ground station which may be received aboard all the aircraft and there utilized to synchronize the aircraft telemetric transmitters, and many examples of suitable methods of synchronizing are well known in the prior art. Since, however, in accordance with regulations of the Civil Aeronautics Authority, all airports or traffic control centers are to be provided with omnidirectional beacon transmitters, and since all aircraft subject to traffic control will be provided with suitable receivers, as 7a, for receiving signals from the omni-directional beacons and for translating these signals in terms of bearing, and since further present omni-directional beacons provide for transmission of an omni-directional carrier modulated with a thirty cycle signal, I propose to derive synchronizing signals for the operation of the present system from the ODR receivers which are in any event installed aboard the aircraft of the system, abstracting from the receivers the thirty-cycle omni-directional modulation referred to above. It is to be understood, accordingly, that commutators 4 and 9, synchronous pulse timers 1, 2 and 3, facsimile recorder 14, and oscilloscope 8 are all synchronized from signals deriving from a common source 7a, in a manner not shown.

Reference is now made to Figures 1b and 1c for representations of the appearance of the face of the oscilloscope 6 and of the recordings provided by the facsimile recorders 14 and 16, respectively.

Referring to Figure 1b, the face of the oscilloscope 6 is shown divided in three concentric circles, the outer circle 6a representing altitude, and being calibrated in terms of thousands of feet, the intermediate circle 6b representing bearing and being appropriately calibrated, and the inner circle 6c representing range and being calibrated in units of five miles, to a range of sixty miles, the radii of these circles being governed by the values of the bias voltages 10, 11 and 12, respectively.

A group of indications 17a, 17b and 17c is provided, which may correspond with the navigational parameters of the local aircraft, the latter being then at altitude 1500 feet, bearing east, and range 20 miles with respect to the ground station.

Other aircraft provide signals indicative of their positions which likewise provide traces (not shown) on the face of the oscilloscope 6, and the pilot of an aircraft equipped in accordance with the invention is accordingly provided not only with indications of his own position, but also of the position of all other craft adjacent to the same ground station.

Question may arise as to how distinction may be made between a plurality of indications originating aboard distinct aircraft. This may most simply be accomplished by coding distinctively the transmissions from each of the aircraft transmitters 5 utilizing the system, as by means of a coder 5a, so that groups of indications originating aboard any given aircraft may fade in and out on the face of the indicator 6 in time synchronism.

Figure 1c represents a section of record receiving surface 18, as provided by the facsimile recorders 14 and 16, the entire width of the tape 18 being divided into three equal laterally adjacent portions 18a, 18b and 18c, allocated respectively to recordings of altitude, bearing and range, the scanning helical ridges of recorders 14 and 16 being in synchronism with the synchronized commutator 9, and completing each scanning cycle across the width of the surface 18 in one-tenth second.

Each pulse transmitted by the local transmitter 5 or received from remote aircraft by the pulse receiver 13, or in the case of the ground station, by the ground receiver 15, creates a mark laterally of the record-receiving surface 18 at positions corresponding with the time positions of the transmitted pulses, and therefore with the values, in succession, of the quantities altitude, bearing and range of the aircraft.

Two sets of recordings are shown in Figure 1c, one uncoded and the other coded dash-dot, to provide a time record of the geographic location of a pair of aircraft. The aircraft which provides uncoded transmissions is seen to be flying at 8000 feet due east at a slowly decreasing range of about 30–40 miles.

The aircraft which is transmitting coded signals is flying a course northwest, at slowly decreasing range and altitude. A glance at the record indicates that no possibility of collision exists between the aircraft, due to their divergent bearings, and ranges, at the point 19 where their altitudes coincide.

While the system as presented in Figure 1a discloses certain fundamental features of my invention, the material presented is considered introductory merely, and many improvements, expansions of detail, and further features of operational significance, and many variations of the system of Figure 1a will be provided as the specification proceeds.

Figure 2

Reference is now made to Figure 2 of the drawings wherein is indicated schematically and in block diagram one embodiment of a complete airborne station arranged in accordance with the present invention. A synchronous pulse timer is shown, which periodically translates into timed pulses the positions of three meter points, the readings of which are to be transmitted from the aircraft in terms of pulse time positions. The meter 20 is an altimeter and may be of any desired character and generally may operate from an aneroid cell or may involve one of the various forms of absolute altimeters. The meter 21 indicates bearing and may operate in response to signals derived from an ODR receiver 22 to provide measurements of bearing of the aircraft with respect to a given ODR beacon station (not shown). Meter 23 indicates range in terms of the output of a DME receiver 24 supplied to the meter 23 over a lead 25. The ODR receiver 22 may be utilized to provide synchronizing signals to various instrumentalities of the equipment illustrated in Figure 2 of the drawings, by deriving from the receiver 22 and via a thirty-cycle pass filter 27, thirty-cycle signals having a phase identical in all the ODR receivers of the system, since the thirty-cycle signal is derived from modulation impressed on an omni-directional carrier by an IDR beacon station (not shown). Pulses derived from the synchronous pulse timer are applied over an isolating amplifier 30 to a synchronous pulse control circuit 31, which is explained in detail hereinafter and which generates a sharp controlling or triggering pulse for the DME transmitter 5. Each pulse transmitted by the isolating amplifier 30 represents the position of one of the meters 20, 21 and 23, so that the transmissions from the DME transmitter 5 are available for reception and translation into indications of the values of the readings of the meters 20, 21 and 23 aboard any aircraft properly equipped, as well as at ground stations. The DME transmitter 5 may be of conventional character, transmitting short pulses for ranging purposes, these pulses being transponded from a DME transponder on the ground (not shown) and being received on the aircraft's DME receiver 24, where the time lapse between transmission and reception of each pulse is translated by a DME translator 24a, comprised in DME receiver 24, into a voltage having a value corresponding with range from the transponder to the aircraft. The DME receiver 24 itself is gated by means of a DME gating circuit 32 which is controlled from the synchronous pulse control circuit 31 and from a signal derived from the DME translator 24a over a lead 33. The DME gater 32 turns the DME receiver 24 on at its last I. F. stage 24c only for a short period after transmission of each transmitted pulse, and at times corresponding with the range of the aircraft. In this manner transmissions from various remote aircraft are excluded from the DME translator 24a and, when received, occur at random, whereas reception of pulses corresponding to those transmitted by the local transmitter 5 are received consistently at the translator 24a and cause indications of range on the range meter 23. The operation of the DME transmitter 5, the DME receiver 24 and the gater 32 is not explained in further detail herein for the reason that the arrangement is well known per se, having been standardized by the Civil Aeronautics Authority, and forms per se no part of the present invention, except insofar as the DME transmitter is utilized in the present invention as a means for transmitting time pulses, and the range meter 23 associated with the DME receiver 24 is utilized to control operation of the synchronous pulse timer for the purpose of generating pulses timed in accordance with range of the aircraft. The output of the initial I. F. stages 24b of DME receiver 24 is detected in second detector and video amplifier 34d and applied to an indicator 6 and a recorder 14a.

Proceeding now to a description of the operation of the pulse timer itself, the meters 20, 21 and 23 are maintained unilluminated normally and are each provided with a separate source of illumination 35. Sources of illumination 35 must be of character enabling extremely rapid operation since it is intended that each of the sources 35 provide illumination during one-thirtieth of a second, the sources 35 operating in succession and the meters 20, 21 and 23 being read during the time of illumination of each meter. The sources 35 consequently form part of a multiplexing arrangement in the present system. In order to provide for successive time illumination of the lamps 35, they are supplied with energy from a source 36 over a mechanical commutator 37 having three conducting segments 38, one of which is connected to each of the lamps 35, the switch arm 39 of the commutator 37 being driven from a synchronizing motor 40 which is driven by power derived from the thirty-cycle filter 27, the speed of rotation of the arm 39 being reduced with respect to the speed of rotation of the motor 40 by means of a three-to-one reduction gear 41. The motor 40 is of known character and is utilized generally throughout the present system, constituting an inherent framing system, the armature of the motor 40 occupying a definite angular position for each value of phase of its driving voltage, and no separate framing pulses or signals being required to maintain the motor 40 in proper synchronism and phase or frame. Accordingly, and commencing at an arbitrary zero of time, the meter 20 will be illuminated for one-thirtieth second and thereafter unilluminated; the meter 21 will be illuminated for one-thirtieth second immediately succeeding the meter 20 and thereafter unilluminated; and the meter 23 will be illuminated for one-thirtieth second immediately succeeding meter 21 and thereafter unilluminated, the cycle of illumination repeating itself indefinitely. A series of lenses 50 is provided, one for each of the meters 20, 21 and 23, which collimate light originating at the various meters 20, 21 and 23, directing same to the face of an iconoscope 51, or its equivalent. The faces 52 of the meters 20, 21 and 23 may be fabricated of non-light reflecting material whereas the pointers 53 may be fabricated of light reflecting material or may be coated with light reflecting material so that there is presented on the face of the iconoscope 51 images of the pointer positions of the meters 20, 21 and 23 in succession, each image persisting for one-thirtieth second. The iconoscope 51 is provided with deflecting electrodes 52, 53 and 54 which are provided with split phase scanning voltages derived from a phase splitter 55a which is driven from the thirty-cycle filter 27, causing the beam of the iconoscope 51 to rotate at a thirty-cycle rate and to scan the face of the iconoscope 51 once during each thirtieth second. A collector electrode 55 is provided in the iconoscope 51 which generates an output pulse in response to each coincidence of the position of the scanning beam of the iconoscope with the image of an illuminated pointer. The pulse timer, therefore, provides successive groups of pulses during each tenth of a second, each group of pulses comprising three pulses timed each in accordance with the reading of one of the meters 20, 21 and 23. The output of the collecting electrode 55 is applied to the isolating amplifier 30 and utilized to control or trigger the DME transmitter 5 in a manner which has been explained hereinabove.

The structure described hereinabove provides for the transmission on a time-sharing basis of three time-positioned pulses representing respectively the altitude, bearing and range of an aircraft. Reception of these pulses from remote aircraft is accomplished by means of a DME receiver 24, which feeds signals from an I. F. stage 24b to a second detector and video amplifier 24d, the output of which is applied to intensification grid 14 of a cathode ray tube oscilloscope 6 and to the marking electrode 63 of the facsimile recorder 14a.

The oscilloscope 6 is provided with deflecting electrodes 7 which are supplied with phase split voltage from a phase splitter 66 which operates over a lead 67 from the output of the thirty-cycle filter 27. Since the oscilloscope 6 and the iconoscope 51 are driven from identical voltages, their cathode ray beams trace out circles in synchronism and in time phase. Accordingly, the position of an incoming pulse on the face of the cathode ray tube oscilloscope 6 is identical with the position of a pointer image on the face of an iconoscope somewhere in the system.

It will be recalled that the iconoscope 51 reads three meters in succession on a time-sharing basis. It is accordingly necessary that the cathode ray tube 6 provide three distinguishable indications which may be related to the different types of instruments. In order to accomplish this the tube 6 is supplied with a deflecting anode 8 to which is connected a series of different bias voltages 10a, 11a, 12a, which are applied to the deflecting anode 8 over a synchronous commutator 9 which is mechanically coupled with the commutator 37 and identical therewith in structure and which consequently operates in precise synchronism and phase therewith. The voltages from the bias sources 10a, 11a, 12a are applied to the anode 8 over a lead 71, providing different radii for three successive traces on the face of the oscilloscope 6, a trace of one radius providing altitude readings, a trace of another radius providing readings of bearing, and a trace of still another radius providing readings of ranges. These traces may be suitably calibrated to enable direct readings of the altitudes, bearings and ranges of the transmitting aircraft, as well as of all aircraft in the vicinity of the transmitting aircraft, as illustrated in Figure 1b.

Facsimile recorder 14a may be provided with a rotating platen 80 having thereon a raised metallic helical ridge 81, platen 80 being rotated in time synchronism with the commutators 37 and 9 over a mechanical connection indicated by the dotted line 82, so that one complete rotation of the platen 81 corresponds with the time required to read all three meters 20, 21 and 23 in succession. The recorder 14a is provided in the usual manner with a record receiving surface 18 which may be divided into three adjacent strips, each of which is allocated to recording measurements of a distinct quantity. In operation, therefore, while the meters 20 are being read at the various aircraft of the system during one complete revolution of the beams of the iconoscopes 51, the beam of the cathode ray tube 62 likewise makes one complete revolution, as about line 6a of Figure 1b, and is intensified at positions as 17a corresponding with the time positions of pulses provided by the DME transmitters of the various aircraft, which in turn corresponds with the positions of the images of the pointers of the meters 20.

Simultaneously the platen 80 of the facsimile receiver 14a scans from zero position to a line (Figure 1c) situated one-third the distance across the record-receiving surface 18, and pulses transmitted by the various aircraft cause production of marks within this recording strip which occupy positions corresponding with the readings of the pointers of the meters 20 aboard the craft. During the next cycle of output of the filter 27 the positions of the bearing meters 21 are read and indicated on the face of the cathode ray tube oscilloscope as spots 17b on a circle of changed radius and on the record-receiving surface 18 on a strip 18b thereof extending from a line one-third of the way laterally of the paper to a line two-thirds of the way laterally of the paper. The range meters 23 are then read by the iconoscopes 51 during the succeeding cycle of output of the filter 27, and their positions indicated on the oscilloscope 62 about a circle of still another radius 6c and on the recorder 64 on the remaining strip 18c of the record-receiving surface 18. Aboard all the other aircraft of the system, since these are synchronized with the station of Figure 2, the received pulses provide indications and recordings which are identical with those provided on the local craft.

It will now be noted that indications aboard each of the aircraft are representative of altitudes, bearings, and ranges of all adjacent aircraft. For purposes of traffic control and to prevent collision, this is totally unnecessary, since aboard each of the aircraft the only information desired concerns aircraft which are adjacent to the transmitting aircraft, and all other indications or recordings may serve to confuse. To accomplish elimination of undesired indications and recordings, the DME receiver 24 may be time gated. Various methods and means for time gating the DME receiver may be devised without departing from the spirit of the overall system. One preferred form of time gating will now be described which has advantages of simplicity.

In connection with time gating (which should not be confused with the "DME gating" mentioned hereinabove), reference is made to Figures 3 and 4 which may be taken in conjunction with Figure 2 of the accompanying drawings.

Figure 3:
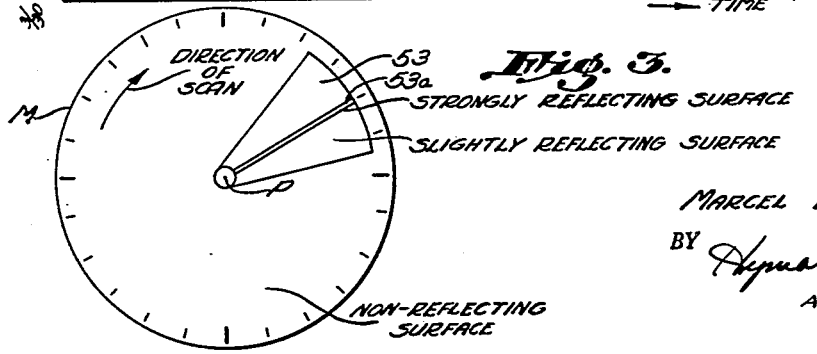
Figure 3 is a view in plan of the face of a meter, and of a novel pointer element, utilized in generating time gating waves and pulsing signals, in the practice of the invention.

In Figure 3 is illustrated the face of a dial or meter M, which may correspond with any of the meters 20, 21, 23 of Figure 2, and which has a pointer element 53, the position of which circumferentially of the face of the dial M represents the value of a measurable quantity such as altitude, bearing or range, the said position being translatable into the time position of a pulse by means of any one of the synchronous pulse timers disclosed in the present application, or in the related applications referred to above.

The pointer element 53 is constructed to have a predetermined width which may be different in the case of each of the meters, this width corresponding with a gate time for the system. For example, if the pointer element 53 of meter 20 has a width corresponding with 1000 feet of altitude, the receiver 24 (Figure 2) is intended to be gated open for a total time corresponding with the time required for the iconoscope 51 to scan 1000 feet of altitude on the face of the meter 20. The transmitted pulse corresponding in time position with the altitude of the local aircraft is intended moreover to occur centrally of the time gate.

In order to accomplish the above objective, the pointer element 53, Figure 3, is fabricated of weakly light reflecting material, and centrally of the pointer element 53 is provided a sliver 53a of strongly light reflecting material. So, the pointer element 53 may be painted white, while the central sliver 53a may be fabricated of polished metal. The sliver 53a may represent the true pointer of the system, the whitened expanse of the element 53 being provided merely for the purpose of generating a time gate.

If we assume now that the scanning electron beam of the iconoscope 51 is scanning across the image of a pointer element 53, upon reaching the edge of the element 53 a current of predetermined amplitude G (Figure 4) will be generated in response to light reflected by the whitened portion of the element 53. The current of magnitude G will continue to flow, as the beam continues to scan, until the sliver 53a is reached, at which time a sudden sharp increase in output occurs from collector electrode 55a of iconoscope 51, corresponding with pulse P (Figure 4) superposed on the level G. After passing the sliver 53a the current output of iconoscope 51 reverts to level G, until the scanning beam completes its passage across the pointer element 53, at which time the output reverts to zero.

The gating pulse G is applied over gating wave generator 32 to the initial I. F. stages 24b of DME receiver 24, to gate the receiver on, the stages 24b being otherwise gated off, or de-sensitized. The generator 32 may, in the present instance, comprise an amplifier of the limiting type, which applies to the stages 24b an on-gating pulse of predetermined amplitude in response to the signal G, wiping out the pulse P.

The wave G and its superimposed pulse P are further applied, over lead 70, to a synchronous pulse control circuit 31, which may comprise an amplifier biassed back to pass signals only when they exceed a predetermined amplitude and a following triggering circuit. In the present application, the level G fails to actuate the pulse control 31, but pulse P is sufficient for this purpose, providing an output triggering pulse for the DME transmitter 5, and a control pulse for the DME gater 32, the function of which has been elsewhere described.

Time gates of different width may be applied to different ones of the quantities measured by meters 20, 21, 23 by constructing the corresponding pointer elements 53 to be of appropriate width.

Reference is now made to Figures 5 and 6 of the drawings, Figure 5 representing in functional block diagram an airborne equipment in accordance with the invention, which is similar in many respects to the system of Figure 2 of the drawings but which utilizes a different type of gating system and which has been materially simplified by omission of various details and features included in Figure 2 to enable a ready understanding of the essence of the invention. Figure 6 represents a sequence diagram which is useful in clarifying the explanation of the operation of the system of Figure 5.

Referring now particularly to the system of Figure 5, there are provided three synchronous pulse generators identified by the numerals 1a, 2a and 3a, each of which transmits a pulse once during each of the basic time periods of the system, to wit, one-thirtieth second, the time of occurrence of the pulses being determined respectively by telemetric modulators 1b, 2b and 3b. The modulator 1b may provide a timing control for the pulse generated by the generator 1a in accordance with the altitude of the aircraft concerned, the modulator 2b may determine the time of occurrence of the pulse provided by the generator 2a in accordance with the bearing of the aircraft, and the modulator 3b may determine the time occurrence of the pulse generated by the generator 3a in accordance with the range of the aircraft. The specific manner in which the modulation of the pulses provided by the generators 1a, 2a and 3a takes place is not disclosed in Figure 5, and specifically I may utilize the pulse time modulation system disclosed in Figure 2, and I may employ one of the systems disclosed in my prior application Serial No. 770,686 and entitled "Synchronous Telemetric Systems," now U. S. Patent Number 2,538,065, or I may utilize the pulse timing device disclosed in the Wallace-Wu application Serial No. 633,138 entitled "Panoramic Position Indicator," now U. S. Patent Number 2,505,314, or any other pulse position modulation system known to the prior art may be utilized, within the intended scope of the invention.

Referring to Figure 6, line 6a represents a time extending for one-tenth second and divided into three parts, A, B and C, extending, in succession, each for a period of one-thirtieth second. The period of one-thirtieth second represents the fundamental time period of the system, each of the pulse generators 1a, 2a and 3a generating pulses at the rate of thirty per second, and each of the pulses being positioned in accordance with an appropriate telemetric quantity within the proper segment A, B or C of the line 6a. In the present case and for purposes of example only, an altitude 200 is represented (Figure 6) occurring repetitively midway of the segments of line 6a so that, should the total altitude range of the instrument be 10,000 feet, the time position of the pulse 200 will represent an altitude of 5000 feet. The bearing representative pulses 201 are shown positioned along the line 6b repetitively and represent bearings arbitrarily placed approximately at 72 degrees. On the line 6c are shown pulses 202 which occupy positions eight-tenths of the distance along each time period representative segment of the line 6c. Hence, should the total range of the instrument be fifty miles, for example, the time positions of the pulses 202 represent a range of forty miles. Synchronous pulse generators 1a, 2a and 3a may be synchronized from a source of synchronizing and framing signals 203 which may be of any desired character but which, as in the system of Figure 2, may be derived from an ODR receiver, and which may be constituted of a thirty-cycle omnidirectional modulation available from an ODR beacon. The signal derived from the source of synchronizing and framing signal 203 may be applied to a synchronous multiplexing commutator 4a which may be mechanical in nature as shown specifically at 37 of Figure 2, or which, in accordance with known techniques, may be electrical. The output of the synchronous multiplexing commutator 4a is applied to the DME transmitter 5 for transmission. Since the commutator 4a permits transmission of signals from generator 1a only during time segment A and from generator 2a only during time segment B and from generator 3a only during time segment C, the signals applied to the DME transmitter 5 from the commutator 4a may be represented by the pulses shown on the lines 6d, 6e and 6f of Figure 6, there being a successive transmission during successive time segments A, B and C, respectively, of an altitude representative pulse, a bearing representative pulse and a range representative pulse. As has been explained hereinbefore, the pulses received from the various aircraft on pulse receiver 13 are applied to a facsimile recorder 16 and to a cathode ray tube indicator 6, the operation of which may be controlled and synchronized with the operation of either the source 203 or the synchronous multiplexing commutator 4a in a manner which has been specifically explained in connection with Figure 2. Further, as has been explained in connection with Figure 2, it is desirable that the pulse receiver 13 be gated to eliminate indications representative of navigational positions of aircraft which are remote from the receiving aircraft in order that the pilot shall not be confused by a multiplicity of indications which have no interest for him. One possible gating system has been explained in connection with the description of Figures 2, 3 and 4 of the drawings. In Figure 5 still a different gating system is described which has certain advantages of flexibility not present in the system of Figure 2. More particularly, each of the generators 1a, 2a and 3a applies its pulses not only to the synchronous multiplexing commutator 4a, but also to a series of delay lines 204a, 204b and 204c, respectively, each of which may be separately and manually adjusted. The output of the delay lines 204a, 204b and 204c, respectively, are applied to blanking pulse generators 205a, 205b and 205c, respectively. The pulse receiver 13 is arranged to be normally on and the blanking pulse generators 205a, 205b and 205c are arranged to turn the pulse receiver 13 off or, technically expressed, to blank the receiver 13 during times when it is desired that signals not be received. Referring to Figure 6 of the drawings and specifically the line 6g thereof, there is illustrated the altitude pulses in positions assumed thereby after delay in the delay line 204a. For purposes of illustration, a delay time of ten per cent of each basic time period A, B or C has been assumed. Lines 6i and 6k likewise disclose the position of delay pulses deriving from the generators 1a, 2a and 3a, respectively, a delay time of ten per cent being assumed in these cases also. It will be realized, however, that any desired delay time may be introduced by suitable adjustment of the delay lines 204a, 204b and 204c and that delay lines of ten per cent have been adapted solely for simplicity of representation in Figure 6 of the drawings.

The delay pulse in each case initiates generation of a blanking wave 207. Referring particularly to the altitude pulses, the wave 207 is initiated at the time 208 extends to the end of time segment A as at 209, and then into time segment B, terminating at point 210. The total time of the blanking wave 207 is selected to extend for eighty per cent of the time of any of the segments A, B, C. Since the blanking wave 207 was initiated 1/300 second after the occurrence of altitude representative pulse 200 and extends for eighty per cent of one-thirtieth second or for 8/300 of a second, the blanking wave 207 terminated 1/300 of a second before a succeeding altitude representative pulse 200. Thereby, gaps in the blanking wave 207 are caused to straddle the altitude representative pulses 200 at all times, leaving the receiver 13 operative for a period just prior to and after occurrence of the pulse 200, which may be determined by suitable adjustment of delay lines 204a, 204b and 204c and of the blanking generators 205a, 205b and 205c. The blanking wave corresponding with the bearing generators and the blanking wave corresponding with the range generator are represented on lines 6j and 6l, respectively, of Figure 6 and need not be described, since they correspond in respect to their theory of operation with the blanking wave associated with altitude.

Various blanking waves provided by the generators 205a, 205b and 205c are applied to a synchronous multiplexing blanking commutator 4b which may be identical with the commutator 4a and which applies to the pulse receiver 13 blanking waves appropriate to the successive time segments A, B and C, wiping out the remaining blanking waves. Reference is made to line 6n which represents the total blanking signal developed during a complete time cycle extending over the time segments A, B and C and composed of a sequence of blanking waves corresponding with the blanking wave occurring during period A at line 6h, during period B at line 6j, and during period C at line 6l. Since blanking waves must normally be of negative polarity, the blanking waves displayed on line 6n are reversed in phase at the commutator 4b and are applied to the pulse receiver 13 in a negative sense as indicated in line 6d. Since the cathode ray tube 6 and the facsimile recorder 14a can provide indications and recordings, respectively, only while the pulse receiver 13 is unblanked, which occurs during the time periods labeled 213, 214 and 215, respectively, on line 6d of Figure 6, it will be evident that only those telemetric quantities will be recorded or indicated which have proper values to enable pulses corresponding therewith to be transmitted within the time periods 213, 214 and 215 and that these quantities must bear a predetermined relation to the corresponding quantities aboard the recording and indicating aircraft. So, for example, in the case of altitude, and utilizing the time sequence of Figure 6, no aircraft which is more than 1000 feet either above or below the position of the receiving aircraft will provide indications at the indicator 6 or a record at the recorder 14a.

Scale expansion

Hereinbefore in connection with the explanation of Figure 2 of the drawings, the display on the cathode ray tube oscilloscope 6 was assumed to be made in three concentric circles, one representative of altitude, one of bearing, and one of range, and the complete circle on the face of the oscilloscope 6 represented a complete range of possible values of telemetric quantities within the system. So, if the entire range of altitudes measured in the system were 10,000 feet, a complete altitude representative indication on the face of the oscilloscope 6 corresponding with a complete cycle of rotation of the beam of the oscilloscope 6 would represent 10,000 feet. Since, however, gating of the telemetric receivers has been adopted, it will be clear that a large percentage of the face of the oscilloscope will be totally unused. It would, therefore, appear to be desirable to expand the scales on the face of the oscilloscope 6 to enable one complete measurement circle to represent substantially the total time during which the receiver 24 is gated on. This may be accomplished in several ways. Specifically, in Figure 2 the line 67 may be opened and the thirty-cycle signal deriving from the filter 27 may be applied to phase splitter 66 over a frequency multiplier 220. If we now assume that the receiver 24 is gated on for only 20 per cent of the total time of a time segment, as in Figure 6, the frequency multiplier 220 may multiply by a factor of five. Thereby, each rotation of the beam of the oscilloscope 6 will occur during one-fifth of the total time segment A, and the beam will travel five times faster than normal about its measuring circle. All indicated pulses will arrive at the intensifying grid 14 of tube 6 during one complete revolution of the beam of the tube, the remaining four revolutions of the beam being aborted due to the gating of the receiver 24. Indications of telemetric quantities, therefore, will be spread about the face of the tube 6, one complete circle representing a quantity in our example of 2000 feet. Since the gating pulse may occur at any time during a cycle of operations of the device, the time of initiation of an effective indicating circle on the face of the indicator 6 occurs at random. Nevertheless, since the output of the frequency multiplier 220 is tied to the output of filter 27, the cathode ray tube beam occupies a definite position for each instant of time in the timing cycle of the system regardless of the time of opening of the gate of the receiver 24 and, accordingly, indications on the face of the indicator 6 have definite significance and may be interpreted in terms of telemetric quantity.

The cathode ray tube 6 with its circular trace may be replaced by a similar tube 6a (see Figure 7) which, however, is provided with a linear trace. In this event the vertical deflecting electrode 7a of tube 6a may be supplied with bias voltage derived from the line 71 of the circuit of Figure 2, whereby is applied to the electrode 65a a stepped series of voltages deriving from the commutator 9, so that each quantity on the face of the oscilloscope 6a is represented on a different vertical line thereof. Gating waves derived from the generator 92 of Figure 2 may be applied to control the sawtooth generator 221 which provides a sawtooth output 222 commencing at the time of initiation t1 of the gating wave G and terminating at the time t2 of termination of the gating wave G. The output of the sawtooth generator 221 is applied to horizontal plate 7b of the oscilloscope 6a and there adjusted to provide a complete sweep across the face of the oscilloscope 6a during each gating wave G. Since the transmitted telemetric pulses from the local aircraft are positioned centrally of the gating pulse G, the navigational position of the transmitting aircraft is represented centrally of the lateral indications 223 on the face of the oscilloscope 6a. Pulses received from adjacent aircraft during the gating time G are applied to the intensifying electrode 14 as in the system of Figure 2 and therefore assume positions either to the right or to the left of the center line of the indications 223 according as the telemetric quantity transmitted is greater or less than that corresponding with the positions of the transmitting aircraft. While we have now provided for expansion of the scale of the cathode ray tube indicator 6 and have provided two different types of scale therefor, one of which is rotating and wherein the time of occurrence of all pulses whether those of the transmitter or those of remote aircraft occupy definite positions about the face of the indicator which are representative of telemetric quantities, and another wherein the transmissions of the local aircraft are at all times centrally located on the face of the cathode ray tube, all other indications being represented at positions relative to the position of the transmitting aircraft so that telemetric indications have relative significance but no significance of absolute values, we have not heretofore explained how similar objectives may be accomplished in the operation of the facsimile recorder 14a.

In the system of Figure 2 the facsimile recorder 14a will provide recordings of the position of the transmitting aircraft which have telemetric significance and of navigational parameters corresponding with the positions of remote aircraft which similarly have absolute telemetric significance, recording taking place over a portion of the record-receiving surface 18 which is gated just as is the receiver 24. Accordingly, with the twenty per cent gate, for example, only twenty percent of the recording surface 18 is utilized and recordings which are provided are crowded and therefore difficult to read (see Figure 11). One simple way to overcome this difficulty is indicated in Figure 8 of the drawings, wherein is shown in simplified conventionalized form a facsimile recorder having an input terminal T0 corresponding with the terminal T1 of Figure 2 and controlled from a commutator 240 which is identical with the commutator 37, the rotating arm 241 of the commutator being connected to a source of positive voltage 242 which is applied over leads 243 in sequence to a series of amplifiers 244 which are normally biased off, the potential deriving from the source 242 serving to turn the amplifiers on. Since the commutator 240 is synchronized similarly to the commutator 37, the amplifiers 244 may be considered time gated all in sequence at times corresponding with the time segments A, B and C (Figure 8). The amplifiers 244 are connected respectively with recording electrodes 245 of the facsimile recorder 246, the electrodes 245 being electrically isolated but aligned in recording relation over the helical platen 247, which contains thereon a helical ridge 248. The ridge 248 may extend three times about the surface of the cylinder 247 to provide one helical turn for each of the platens 245. The cylinder 247, moreover, may, if desired, be driven over a speed increasing gear 249 from the commutator 240, the speed ratio of the gear 249 being left for the choice of the designer. If, for example, we assume a speed ratio of two to one, the scanning rate of the turns of the helix 248 across the recording electrodes 245 will occur at twice the speed at which the telemetric quantities of the system are being scanned. Accordingly, the record provided on the record-receiving surface 18 will be extended laterally to twice its normal dimensions. The gating of the amplifiers 244 by the synchronous commutator 240 assures that no signals will be applied to any of the recording electrodes 245 except those appropriate to a particular electrode. So, one of the electrodes may be timed to receive altitude signals, another to receive bearing signals, and a third to receive range signals. If we assume a train of pulses to be arriving at times corresponding with zero altitude, these pulses will be recorded laterally of the record-receiving surface 250 at positions corresponding to zero altitudes. Pulses having time positions corresponding to 5000 feet will be recorded at the extreme right end edge of the lateral segment of the record-receiving surface 200 allocated to altitude, since the platen 248, scanning at twice normal speed, would have reached a recording position corresponding to 10,000 feet in the recorder 64 of Figure 2. A certain ambiguity is introduced into the picture by this action, since altitudes of 5000 and of 10,000 feet will be recorded in identical positions. The pilot of the aircraft, however, knowing his own approximate altitude is readily enabled to interpret the recordings on the record-receiving surface 250 and has the advantage that his scale of recording is extended by the factor of two laterally of the paper. By the same token, for a twenty per cent gate in the system the speed which gear 249 may have is a speed ratio of five to one in which case 2000 feet of altitude will be represented across the lateral extent of the record-receiving surface 250 which is allocated in the system of Figure 2 to an altitude of 10,000 feet. No transmitted pulses are lost in this system, but the helical platen 248 rotates to no purpose for a percentage of time corresponding with the percentage of time during which the telemetric receiver 24 is gated off. The system of Figure 10 represents merely one possible system of expanding the recording scale of a facsimile recorder, a typical record being that illustrated in Figure 2 of the drawings.

*Centralized time gating*

Still another system is illustrated in Figures 9 and 10 which corresponds in essence to the system of Figure 7 in that in the systems of Figures 9 and 10 the local transmissions appear always centrally of the record-receiving surface of the facsimile recorder and all other indications appear to the left or to the right of the locally generated record, recording as the quantities represented take on relatively lesser or greater values. In the system of Figure 9 three separate facsimile recorders 250 are provided which are driven in synchronism by means of signals derived from the ODR receiver as in Figure 2. However, the facsimile recorders 250 are not framed or phased by the latter signals but are supplied with separate framing pulses corresponding with the signals transmitted by the local aircraft, and signals corresponding with the different quantities are transmitted to each of the recorders 250 by means of the multiplexing synchronous commutator 251. In this manner, each recorder 250 records one quantity only and by virtue of the framing of each recorder in accordance with the value of the locally transmitted quantity recorded thereby, a self-record S is provided by each of the recorders 250 which extends centrally of the record-receiving surface associated therewith and which corresponds with the position of the local aircraft. Since the recorders 250 are synchronized from the ODR receivers 22, if the recorders 250 are of conventional character, recordings will take place along only a narrow strip of the total record-receiving surface available. Accordingly, the recorders 250 may be constructed in a nonconventional fashion as illustrated in Figure 12, the helical ridge 252 of each of the recorders 250 being arranged to extend not entirely about the surface of the cylinder 253, but for only a portion of that surface. For example, the ridge 252 may extend for twenty per cent of the surface 253, in which case during twenty per cent of the rotation of the cylinder 253 the ridge 252 will scan the entire length of the recording electrode 254 and during the remaining 80 per cent of rotation no recording will take place. Since the entire length of the electrode 254 is scanned in twenty per cent of the total time of rotation of the cylinder 253, twenty per cent of the range of the telemetric quantity being recorded forms an impression on the record-receiving surface. It will be apparent that with a system of this type, gating of the telemetric receiver 60 is unnecessary unless it is desired to narrow the gating period to less than twenty per cent of the total time period of the system, since the construction of the facsimile recorders of Figure 10 provides inherent performance of a time gating function. A typical altitude record provided by the system of Figure 9, utilizing a recorder of the type illustrated in Figure 10 of the drawings, is illustrated in Figure 13 of the drawings, wherein the altitude of the local aircraft is recorded at all times centrally of the record receiving surface, the altitudes of remote craft being represented by lines at lateral positions determined by relative altitudes with respect to the altitude of the local craft. This record provides no indication of whether the local or the remote craft is changing altitude, but only of their relative altitudes. In Figure 12, on the other hand, although the absolute altitude of none of the craft is displayed, the changes of absolute altitude of both local and remote craft are represented. The representations of Figures 11 and 12 are similar, the difference in the figures pertaining to the relative durations of the time gates utilized.

The DME radars utilized as transmitters in the present system require for their effective operation that pulse transmission times be random. In the present system this randomness is provided in several ways. First, the fact that pulses are transmitted in groups of three, each pulse of a group representing a different quantity in terms of its time position, introduces a randomness into the transmissions. Second, the time positions of pulses being determined by the positions of a physical pointer, slight vibrations of the pointer positions while the aircraft are in flight, introduces a further randomness. Should the above sources of randomizing of pulse time positions be insufficient artificially induced randomizing may be resorted to.

While I have described and illustrated a plurality of specific embodiments of my invention, it will be clear that variations and rearrangements of the various specific embodiments may be resorted to without departing from the true scope of the invention, as defined in the appended claims.

What I claim and desire to secure by Letters Patent of the United States is:

1. In a telemetric system, means for delimiting synchronous repetitive periodic time intervals for said system, a pulse generator, a measuring device, means for controlling said pulse generator in response to said measuring device to provide pulses positioned within said time intervals in accordance with measurements accomplished by said measuring device, means for transmitting said pulses, remote means for receiving the transmitted pulses, means for time gating said means for receiving to prevent reception of said pulses by said means for receiving at predetermined periods within said periodic time intervals, and means for controlling said means for time gating in accordance with the time positions of the transmitted pulses.

2. The combination in accordance with claim 1 wherein is further provided a space scanning indicating device responsive to said means for receiving said signals, and means for synchronizing the scanning of said indicating device with occurrence of said time intervals.

3. The combination in accordance with claim 2 wherein is further provided a space scanning indicating device responsive to said means for receiving signals, means for synchronizing the scanning of said indicating device with occurrence of said time intervals, and means for framing the scanning of said indicating device with respect to initiation of said time intervals.

4. The combination in accordance with claim 1 wherein is further provided a space scanning indicating device responsive to said means for receiving said pulses for providing visual indications, and means for synchronizing the frequency of scanning of said indicating device with a multiple of the frequency of occurrence of said periodic time intervals.

5. A telemetric system comprising a plurality of measuring devices for measuring the magnitudes of measurable and variable quantities, pulse generating means, means responsive to each of said measuring devices in succession for actuating said pulse generating means to generate at least one time positioned pulse having a time position corresponding with a measurement effected by said measuring device, a pulse type distance measuring equipment having a transmitter for transmitting radiant energy pulses and a receiver for receiving said radiant energy pulses after return thereof from a remote object, and means responsive to said first-mentioned pulses for triggering said transmitter of said distance measuring equipment to transmit said radiant energy pulses.

6. The combination in accordance with claim 5 and further comprising a remote receiving and indicating means for translating said radiant energy pulses into indications in juxtaposed and distinguishable relation of the values of said measurements as determined by the time positions of said translated radiant energy pulses.

7. The combination in accordance with claim 5 and further comprising a recording means having a plurality of helical scanning means and a corresponding plurality of linear platen means each scanned by one of said helical scanning means, remote means for receiving said radiant energy pulses, means responsive to said means for receiving for applying said pulses to said platen means, and means for applying to each of said platen means pulses positioned in response to one only of said plurality of measuring devices.

8. In a navigational system for aircraft, a pulse transmitter aboard one of said aircraft for transmitting radiant energy pulses to a remote location for retransmission therefrom, means at said remote location for retransmitting further radiant energy pulses to said aircraft in response to said first mentioned pulses, means aboard said aircraft for receiving said further radiant energy pulses and for translating said further radiant energy pulses when received by said means for receiving into a visual indication of range of said aircraft from said remote location, means aboard said aircraft for timing the transmission times of said radiant energy pulses with respect to periodic base time intervals, said last means comprising measuring means aboard said aircraft for measuring the value of at least one measurable variable quantity, and means responsive to said measuring means for controlling said means for timing the transmission times of said radiant energy pulses to provide radiant energy pulses each timed with respect to one of said periodic base time intervals in accordance with the value of said at least one measurable variable quantity.

9. In a navigational system for aircraft wherein transmissions to said aircraft are provided from an omni-directional range beacon at a first location, said transmissions comprising alternating current signals having equal phase omnidirectionally from said beacon and wherein is further provided radiant energy pulse retransmission means adjacent said first location, the combination of, a radiant energy pulse transmitter aboard said aircraft for transmitting radiant energy pulses to said radiant energy pulse retransmission means for retransmission thereby, and a radiant energy pulse receiver for receiving retransmitted pulses, means aboard said aircraft for receiving said alternating current signals, means aboard said aircraft for measuring the value of at least one variable quantity, means responsive to said means for measuring for controlling the times of occurrence of pulses transmitted by said radiant energy pulse transmitter with respect to the period of said alternating current signals in accordance with said value of said at least one variable quantity.

10. The combination in accordance with claim 8 wherein is further provided remote means for receiving said radiant energy pulses each timed with respect to one of said periodic base time intervals in accordance with the value of at least one measurable variable quantity, and means for comparing the timing of said radiant energy pulses as received by said remote means for receiving with said periodic base time intervals.

11. The combination in accordance with claim 8 wherein is further provided remote means for receiving said radiant energy pulses each timed with respect to one of said periodic base time intervals, a cathode ray tube indicator having means for generating a cathode ray beam, means for periodically deflecting said cathode ray beam over a predetermined path in synchronism with said periodic base time intervals, and means for modulating said cathode ray beam in response to said radiant energy pulses.

12. The combination in accordance with claim 9 wherein is provided further, means at a remote location for receiving said radiant energy pulses, means for receiving said alternating current signals, and indicating means responsive to said alternating current signals and to said radiant energy pulses received at said remote location for visually indicating said value of said at least one variable quantity.

13. The combination in accordance with claim 9 wherein is further provided, means at a remote location for receiving said radiant energy pulses, means at said remote location for receiving said alternating current signals, and a cathode ray tube indicator having means for generating a cathode ray beam, means responsive to said alternating current signals for periodically deflecting said cathode ray beam in a predetermined path, and means responsive to said means at a remote location for receiving said radiant energy pulses for modulating said cathode ray beam in response to said radiant energy pulses.

14. In a navigational system for aircraft wherein transmissions to said aircraft are provided from an omni-directional range beacon at a first location, said transmissions comprising alternating current signals having equal phase omni-directionally from said beacon, and wherein is further provided radiant energy pulse retransmission means adjacent said first location, the combination of, a radiant energy pulse transmitter aboard said aircraft for transmitting radiant energy pulses to said radiant energy pulse retransmission means for retransmission thereby, means aboard said aircraft for receiving said alternating current signals, means aboard said aircraft for measuring the values of a plurality variable quantities, means responsive to said means for measuring for periodically controlling the times of occurrence of pulses transmitted by said radiant energy pulse transmitter in succession in accordance with each of said values as measured by said means for measuring and with respect to the period of said alternating current signals.

15. In a navigational system for aircraft wherein transmissions to said aircraft are provided from an omni-directional range beam at a first location, said transmissions comprising alternating current signals having equal phase omni-directionally from said beacon, a radiant energy pulse transmitter, a radiant energy pulse receiver for receiving radiant energy pulses transmitted by said transmitter after retransmission from a remote location, a meter having a pointer, means for generating periodic pulses in response to said alternating current signals and having time positions with respect to the period of said alternating current signals determined by the position of said pointer, and means responsive to said periodic pulses for pulsing said radiant energy pulse transmitter.

16. In a navigational system for aircraft wherein transmissions to said aircraft are provided from an omni-directional range beacon at a first location, said transmissions comprising alternating current signals having equal phase omni-directionally from said beacon, a radiant energy pulse transmitter aboard each of a plurality of aircraft, means aboard each of said aircraft for measuring the magnitude of a variable quantity, means aboard each of said aircraft for controlling transmission times of radiant energy pulses transmitted from said aircraft, with respect to the period of said alternating current signals, in accordance with the magnitude of said variable quantity as measured aboard said each of said aircraft, and means aboard each of said aircraft responsive to said radiant energy pulses transmitted from the others of said aircraft, and further responsive to said alternating current signals, for visually indicating the magnitudes of said measurable quantities.

17. The combination in accordance with claim 16 wherein said last means is a means for visually indicating magnitudes of said measurable quantities falling within predetermined limits only.

18. The combination in accordance with claim 17 wherein said predetermined limits are determined aboard each of said aircraft in accordance with values of said quantities aboard said aircraft.

19. In a navigational system for aircraft, wherein transmissions to said aircraft are provided from an omni-directional range beacon, said transmissions comprising alternating current signals having equal phase omni-directionally from said beacon, a radiant energy pulse transmitter aboard each of said aircraft, measuring means aboard each of said aircraft for measuring the magnitude of a variable quantity, means responsive to the measuring means aboard each of said aircraft for generating modulating pulses having time positions with respect to the periods of said alternating current signals which are determined by said magnitudes as measured by said measuring means, means responsive to said modulating pulses aboard each of said aircraft for actuating said radiant energy pulse transmitters aboard said aircraft to transmit radiant energy pulses, an indicator aboard each of said aircraft having means for generating a visual indication of the magnitudes of said quantities as represented by time positions of said radiant energy pulses, said indicator comprising means for scanning a predetermined path periodically under control of said alternating current signals, and means for instantaneously generating an indication during said scanning in response to a transient voltage, a receiver aboard each of said aircraft for radiant energy pulses transmitted by said transmitters, and means responsive to reception of said radiant energy pulses aboard each of said aircraft by said receiver for generating said transient voltage.

20. The combination in accordance with claim 19 wherein said means for scanning a predetermined path periodically under control of said alternating current signals is synchronized with said alternating current signals.

21. The combination in accordance with claim 19 wherein said means for scanning a predetermined path periodically under control of said alternating current signals is synchronized with a frequency derived from said alternating current signals by multiplication of the frequency of said alternating current signals.

22. The combination in accordance with claim 19 wherein means is provided for periodically blocking said receiver under control of said alternating current signals to eliminate indications representative of ranges of value of said magnitude.

23. In combination, a transmitter for providing a reference signal having equal phase omni-directionally and a bearing representative further signal having a phase dependent upon bearing from said transmitter, a receiver aboard each of a plurality of craft for receiving said signals, means for translating one of said signals aboard each of said craft into time position modulated signals, a distance measuring equipment comprising a radiant energy pulse transmitter and a receiver for receiving said radiant energy pulses after retransmission from a remote location, means aboard each of said craft for controlling the times of transmission of said radiant energy pulse transmitter aboard said craft in response to said time position modulated signals, means aboard each of said pulrality of craft for receiving said radiant energy pulses from the remainder of said plurality of craft, and means aboard each of said craft for translating said radiant energy pulses into visual indications.

24. In combination with a transmitter for providing a reference signal having equal phase omni-directionally and a bearing representative further signal having a phase dependent upon bearing from said transmitter, and with a receiver aboard each of said aircraft for receiving a plurality of signals, means aboard each of said plurality of aircraft for measuring the magnitude of a variable quantity, means responsive to said means for measuring for translating one of said signals aboard each of said aircraft into a time position modulated signal having a time position determined by said magnitude, means for transmitting said time position modulated signals from each of said aircraft to the remainder of said aircraft, and means aboard each of the remainder of said aircraft for translating said time position modulated signals into visual indications of said magnitudes.

25. The combination in accordance with claim 24 wherein said means for transmitting comprises a radiant energy pulse transmitter of a distance measuring equipment.

26. In combination, a transmitter for transmitting a pair of signals, one of said pair of signals having a phase common to all bearings from said transmitter and the other of said signals having a phase at each bearing from said transmitter which is representative of said each bearing, means aboard each of a plurality of craft adjacent said transmitter for receiving said pair of signals, a visual scanning indicator aboard each of said craft, means responsive to one of said pair of signals for controlling the scanning action of said visual scanning indicator, a pulse transmitter aboard each of said craft, means for measuring the magnitude of a variable quantity aboard each of said craft, means responsive to one of said signals and to said means for measuring aboard each of said craft for controlling times of transmission of said pulse transmitter aboard said craft, a pulse receiver aboard each of said craft for receiving pulses transmitted from the remainder of said plurality of craft, and means responsive to received pulses aboard each of said craft for modulating said scanning indicator.

27. The combination in accordance with claim 26 wherein said pulse transmitters are radiant energy pulse transmitters comprised in distance measuring equipments.

28. The combination in accordance with claim 27 wherein said visual scanning indicator comprises a cathode ray tube indicator, means responsive to one of said pair of signals for controlling movement of the cathode ray of said cathode ray tube indicator, and means responsive to received pulses or modulating the cathode ray of said cathode ray tube indicator.

29. The combination in accordance with claim 26 wherein said visual scanning indicator comprises a cathode ray tube indicator, means responsive to one of said pair of signals for controlling movement of the cathode ray of said cathode ray tube indicator, and means responsive to received pulses for modulating the cathode ray of said cathode ray tube indicator.

30. The combination in accordance with claim 26 wherein said visual scanning indicator comprises a facsimile type recorder having a helical rotating ridge and a recording platen for recording on a record receiving surface intermediate said ridge and said platen, means responsive to one of said pair of signals for synchronizing and framing motion of said helical rotating ridge, and means responsive to received pulses for applying recording signal to said platen.

31. The combination in accordance with claim 26 wherein is further provided time gating means for said pulse receiver for gating said receiver to receive pulses only over predetermined time intervals less than the periods of said signals.

32. In combination, a distance measuring equipment aboard an aircraft and comprising a radiant energy pulse transmitter and a receiver for receiving radiant energy pulses transmitted by said transmitter after retransmission from a remote object, an omni-directional range beacon transmitter having means for transmitting a periodic signal, means aboard said aircraft for generating pulses for controlling said radiant energy transmitter to transmit, means aboard said aircraft for receiving said periodic signal, and means responsive to said periodic signal for controlling the times of occurrence of said pulses.

33. In combination, a distance measuring equipment comprising a radiant energy pulse transmitter and a receiver for receiving radiant energy pulses transmitted by said transmitter after retransmission from a remote object, a source of synchronizing signals comprising an omni-directional range beacon transmitting means, and means for controlling the timing of said radiant energy pulses transmitted by said transmitter with respect to said synchronizing signals in response to an information bearing control signal.

34. The combination in accordance with claim 33 wherein is further provided remote means responsive to said pulses transmitted by said transmitter for abstracting said information from said pulses.

35. In combination, a transmitter for providing a reference signal having equal phase omni-directionally and a bearing representative further signal having a phase dependent upon bearing from said transmitter, a receiver aboard each of a plurality of craft for receiving said signals, means for translating one of said signals aboard each of said craft into time position modulated signals, a radiant energy pulse transmitter aboard each of said craft responsive to the time position modulated signals aboard that craft to transmit radiant energy pulses, a ground repeater responsive to said radiant energy pulses to transmit further radiant energy pulses to all said craft simultaneouly, and means aboard each of said craft for receiving said further radiant energy pulses and for translating said further radiant energy pulses into visual indications of the time positions of all said further radiant energy pulses.

36. The combination in accordance with claim 35 wherein said last named time positions and said visual indications are representative of bearings of said plurality of craft.

37. In combination, a ground transmitter for providing a reference signal having equal phase omni-directionally and a bearing representative further signal having a phase dependent upon bearing from said transmitter, a receiver aboard each of a plurality of craft for translating one of said signals aboard each of said craft into time position modulated signals, a distance measuring equipment aboard each of said craft comprising a radiant energy pulse transmitter responsive to said time position modulated signals to transmit radiant energy pulses, a ground repeater responsive to said radiant energy pulses to transmit further radiant energy pulses to all said craft, and means aboard each of said craft for receiving all said further radiant energy pulses from said ground repeater and for translating all said further radiant energy pulses into visual indications of the time positions of all said first mentioned radiant energy pulses as transmitted by said distance measuring equipment aboard said plurality of craft.

38. The combination in accordance with claim 37 wherein said visual indications are indications of the bearings of said plurality of craft.

39. In combination, a transmitter for transmitting a pair of alternating current signals, one of said pair of signals having a phase common to all bearings from said transmitter and the other of said signals having a phase at each bearing from said transmitter which is representative of said each bearing, means aboard each of a plurality of craft adjacent said transmitter for receiving said pair of signals, a visual scanning indicator aboard each of said craft, means responsive to one of said pair of signals for controlling the scanning action of said visual scanning indicator, and means responsive to another of said pair of signals for modulating indications provided by said scanning indicator, a periodic radiant energy pulse transmitter aboard each of said craft, means responsive to one of said signals for controlling the times of transmission of said periodic radiant energy pulse transmitter, a remote ground located retransmitter for retransmitting the radiant energy pulses, means aboard each of said craft for receiving all the retransmitted radiant energy pulses, and means aboard each of said craft responsive to said last named radiant energy pulses when received by said last named means for receiving for further modulating said indications.

40. The combination in accordance with claim 39 wherein said radiant energy pulse transmitter aboard each of said craft is comprised in a distance measuring equipment aboard that craft, each said distance measuring equipment having means for receiving said retransmitted radiant energy pulses and for indicating distance of said remote ground located retransmitter.

41. In combination, a transmitter for transmitting a first signal having an identical distinguishing characteristic omni-directionally from said transmitter, said transmitter transmitting a second signal having a distinguishing characteristic which is a function of bearing from said transmitter, means aboard each of a plurality of craft for receiving said first and second signals, a visual scanning indicator aboard each of said craft, means responsive to one of said signals for controlling the scanning action of said visual scanning indicator, a transmitter aboard each of said craft for transmitting third signals, a single remote ground located device for receiving and retransmitting said third signals, means responsive to one of said first and second signals for controlling said third signals, a further receiving mean aboard each of said craft for receiving all said third signals from said means for retransmitting, and means responsive to all said received third signals aboard each of said craft for modulating said scanning indicator.

42. The combination in accordance with claim 41 wherein each transmitter for said third signals is a pulse transmitter comprised in a pulse type distance measuring equipment.

43. The combination in accordance with claim 24 wherein said means for transmitting said time position modulated signals from each of said aircraft to the remainder of said aircraft comprises a ground located repeater.

MARCEL WALLACE.

REFERENCES CITED

The following references are of record in the file of this patent:

UNITED STATES PATENTS

| Number | Name | Date |
|---|---|---|
| 2,110,746 | Tolson | Mar. 8, 1938 |
| 2,248,215 | Budenbom | July 8, 1941 |
| 2,252,083 | Luck | Aug. 12, 1941 |
| 2,266,401 | Reeves | Dec. 16, 1941 |
| 2,378,604 | Wallace | June 19, 1945 |
| 2,402,688 | Skurnick | June 25, 1946 |
| 2,403,626 | Wolff | July 9, 1946 |
| 2,412,094 | Moynihan | Dec. 3, 1946 |
| 2,412,350 | Morgan | Dec. 10, 1946 |
| 2,440,253 | Dodington | Apr. 27, 1948 |
| 2,468,703 | Hammel | Apr. 26, 1949 |
| 2,480,123 | Deloraine et al. | Aug. 30, 1949 |
| 2,495,737 | Labin et al. | Jan. 31, 1950 |
| 2,510,066 | Busignies | June 6, 1950 |
| 2,513,282 | Busignies | July 4, 1950 |
| 2,517,540 | Busignies | Aug. 8, 1950 |
| 2,521,697 | Deloraine et al. | Sept. 12, 1950 |
| 2,535,038 | Busignies | Dec. 26, 1950 |